United States Patent [19]
Soya et al.

[11] 4,364,543
[45] Dec. 21, 1982

[54] VALVE DEVICE

[75] Inventors: Masahiro Soya, Kawasaki; Isao Sato, Fujisawa; Seiji Kurose, Yokohama, all of Japan

[73] Assignee: Tokico Ltd., Kanagawa, Japan

[21] Appl. No.: 244,393

[22] Filed: Mar. 16, 1981

[30] Foreign Application Priority Data

Mar. 19, 1980 [JP] Japan .............................. 55-36875[U]

[51] Int. Cl.³ ............................................. F16K 31/50
[52] U.S. Cl. .................................... 251/221; 137/315; 251/265; 251/273; 251/330
[58] Field of Search ............... 251/214, 215, 221, 225, 251/265, 330, 273; 137/315

[56] References Cited

U.S. PATENT DOCUMENTS

| | | | |
|---|---|---|---|
| 364,842 | 6/1887 | Morrin | 251/330 |
| 734,831 | 7/1903 | Diederich | 251/221 |
| 938,080 | 10/1909 | Schreidt | 251/330 |
| 1,151,494 | 8/1915 | Marsh | 251/330 |
| 2,780,233 | 2/1957 | Volpin | 251/330 |
| 3,257,095 | 6/1966 | Siver | 251/330 |
| 3,275,290 | 9/1966 | Siver | 251/330 |

FOREIGN PATENT DOCUMENTS

| | | | |
|---|---|---|---|
| 233848 | 5/1925 | United Kingdom | 251/330 |
| 390841 | 4/1933 | United Kingdom | 251/330 |

*Primary Examiner*—George L. Walton
*Attorney, Agent, or Firm*—Ladas & Parry

[57] ABSTRACT

A valve device comprises a valve body having an inflow passage and an outflow passage, a valve seat fixed to the valve body at a position between the passages, a valve element for seating against and separating from the valve seat, a valve stem movable together with the valve element toward and away from the valve seat, a stem holding member secured at a portion thereof to the valve body in the body interior and holding the valve stem at a screw engagement part therewith where a surface at an extremity of the portion of the stem holding member is in abutting contact with a surface of the main body thereby to form a first metal-contact seal, a bonnet which is detachably fixed to the valve body with a sealing member interposed therebetween, and through which the valve stem is rotatably fitted, where the bonnet covers the remainder portion of the stem holding member, and a mechanism for forming a second metal-contact seal at a stem holding part of the stem holding member when the valve is in the fully opened state thereof.

6 Claims, 7 Drawing Figures

FIG. 1 PRIOR ART
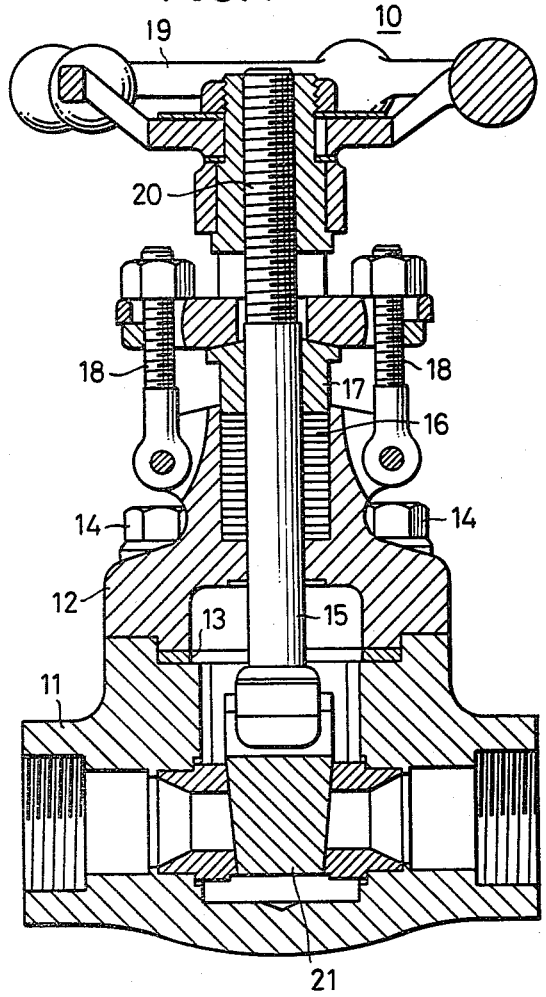
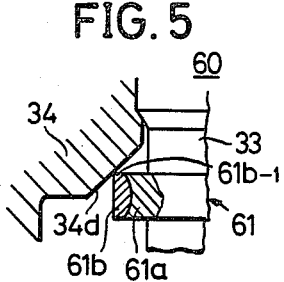
FIG. 5
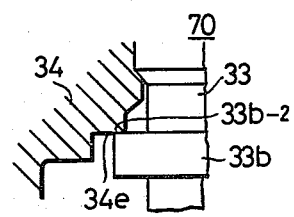
FIG. 6
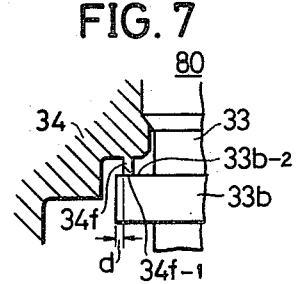
FIG. 7

VALVE DEVICE

BACKGROUND OF THE INVENTION

The present invention relates generally to valve devices and more particularly to a valve device having a valve stem, valve body, and a bonnet, within which a valve stem holding member is provided and is adapted to establish metal-contact seals in cooperation with the body and the stem, whereby other replaceable sealing members can be rapidly and safely replaced while the valve device is in its opened state.

In general, a valve device of the type having a valve casing or valve body, a bonnet, and a valve stem has a construction wherein sealing members such as packings or O-rings are interposed between the bonnet and the valve stem and between the bonnet and the valve body. Since a sealing member of this character has a finite serviceable life, it requires periodical replacement.

This replacement has heretofore been accompanied by difficulties in certain installations of valve devices (hereinafter referred to as valves). For example, in the equipment of a nuclear power plant, the operation is continuous and is not stopped. For this reason, it is necessary that certain valves in the equipment have a construction such that their sealing members can be exchanged with the valves in their opened state and such that the exchanging of the sealing members can be carried out rapidly so as to shorten as much as possible the work time of the worker under conditions which may be conducive to radiation illness because fluids contaminated with radiation are being handled.

A typical valve device known in the prior art has a construction wherein the valve stem is held by only the bonnet, as will be hereinafter described in conjunction with a drawing. For this reason, the replacement of the sealing members with the valve in its opened state becomes very troublesome.

SUMMARY OF THE INVENTION

Accordingly, it is a general object of the present invention to provide a novel and useful valve device in which the above described difficulties have been overcome.

Another and specific object of the invention is to provide a valve device of a construction such that its sealing members can be exchanged with the valve in its opened state, that is, with the equipment in which the valve is installed in operation.

Still another object of the invention is to provide a valve device of a construction which makes possible the work of replacing the sealing members to be performed in a short time with the valve in its opened state.

A further object of the invention is to provide a valve device provided with a double-seal construction comprising a metal-contact seal and a sealing member thereby to assure greater effectiveness in preventing leakage.

Other objects and further features of the invention will become apparent from the following detailed description with respect to preferred embodiments of the invention when read in conjunction with the accompanying drawings.

BRIEF DESCRIPTION OF THE DRAWINGS

In the drawings:

FIG. 1 is a side view, in longitudinal section, showing one example of a valve device known in the prior art;

FIGS. 5, 6 and 7 are fragmentary side views respectively showing modifications of the second metal-contact seal part of a valve device of the invention.

DETAILED DESCRIPTION

Figure 2:
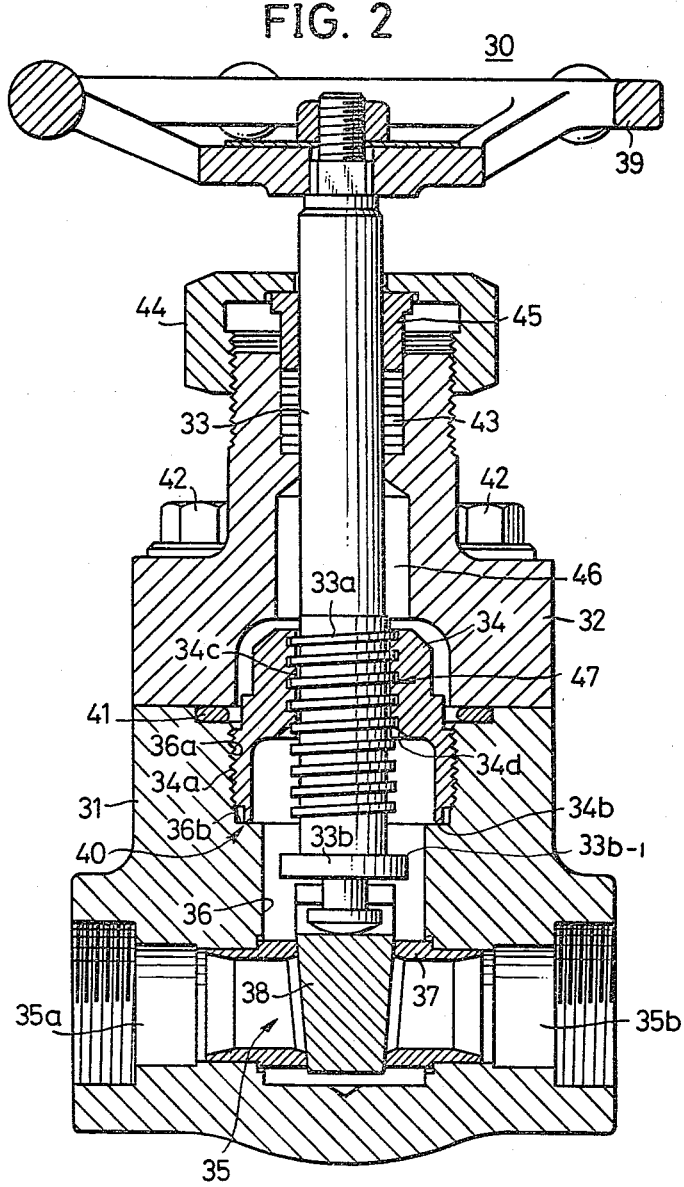
FIG. 2 is a similar view of a first embodiment of the valve device according to the present invention, the valve being shown in closed or shut state.

As conducive to a full understanding of the novelty and utility of the present invention, one example of a conventional valve device will first be briefly described with reference to FIG. 1. Throughout the following description of the known valve device and the valve device according to the present invention, directions indicated by terms such as "upper", "lower", "above", and "below" are those as viewed in the figures of the accompanying drawings.

This known valve device 10, which is a gate valve of the so-called outside screw yoke type, has a housing structure comprising a valve casing or body 11 and bonnet 12 fixed together, with a gasket 13 interposed therebetween, by screws 14.

Centrally disposed partly within the body 11 and extending and beyond the bonnet 12 is a valve stem 15. This stem 15 has a lower sliding part with a smooth outer surface and an upper screw-threaded part 20. An annular gland packing 16 is fitted between the sliding part of the stem 15 and the upper part of the bonnet 12 in order to prevent leakage therebetween. The gland packing 16 is held in place by an annular packing retainer 17, which in turn is pressed downward against the gland packing 16 by fixing bolts 18. The stem 15 is connected at its inner end to a valve element, which in the example shown, is a gate 21. A handle or handwheel 19 is screw engaged with the upper threaded part 20 of the stem 15. By rotating the handwheel 19 the stem 15 can be raised or lowered together with the gate 21 thereby to open or shut the valve.

In the valve device 10 of the above described construction, exchanging of the packing 16 is possible without removing the bonnet 12, that is, with the valve in opened state, by loosening the fixing bolts 18, swinging the same outward, and moving the packing retainer 17 upward. However, in order to replace the gasket 13, it is necessary to remove the bonnet 12. Consequently, it is necessary to stop the flow of the fluid in the piping by shutting separate shut-off valves (not shown) provided in the piping on the upstream and downstream sides of the valve device 10. As a result, at the time of replacement of the sealing members, it is necessary to temporarily stop the operation of the equipment in which the valve device 10 is installed, whereby this valve device 10 cannot be applied in equipment of continuous operation the interruption of which is undesirable.

Furthermore, in the above described valve device 10, the assembly and attachment of the various parts with respect to the body 12 is complicated. Moreover, the packing retainer 17 and related parts cannot be drawn out from the stem 15, and an ample working space cannot be obtained. For this reason, the work of replacing the sealing members is troublesome and requires excessive time. Thus, this valve device 10 is unsuitable for use in equipment handling fluids contaminated with radiation as, for example, the aforementioned equipment in a nuclear power plant.

Accordingly, it is contemplated in the present invention to provide a valve of a construction such that the work of periodically replacing its sealing members can be carried out with the rest of the equipment in continuous operation and, moreover, in a short time.

Figure 3:
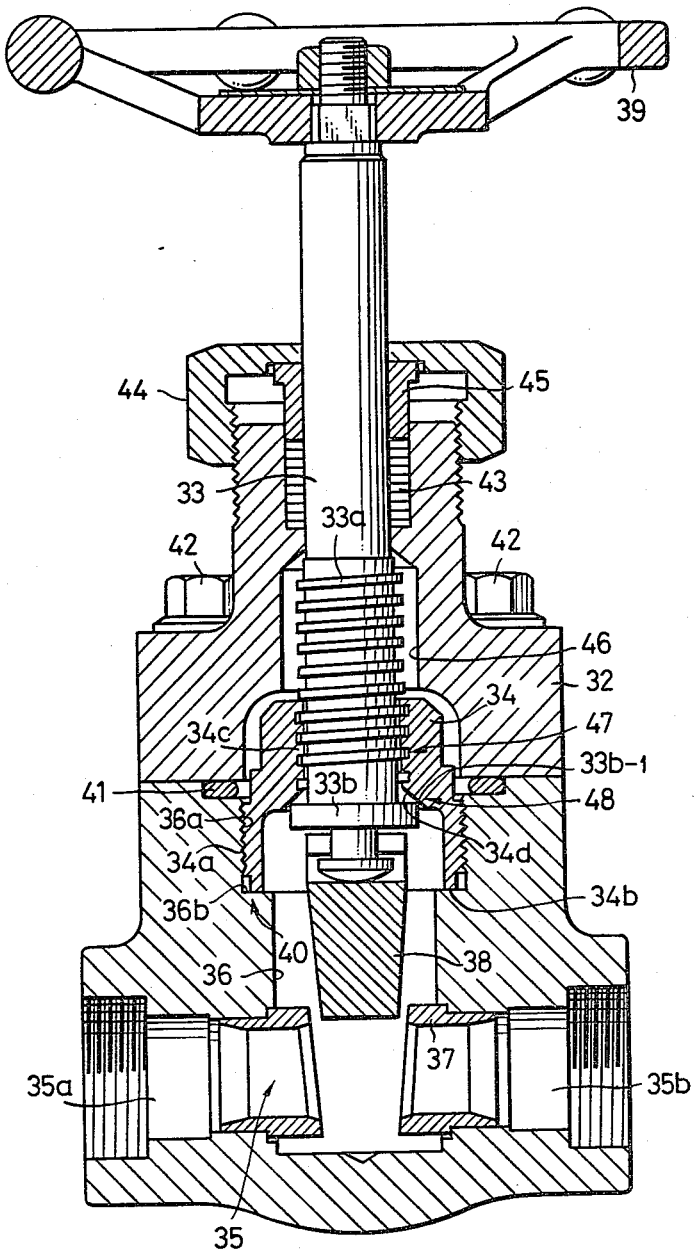
FIG. 3 is another similar view of the valve device illustrated in FIG. 3 in its set state in which it is placed for replacement of its sealing members.

In a first embodiment of the invention as illustrated in FIGS. 2 and 3, a valve device 30, which is of the inside screw type construction, comprises essentially a valve body 31, a bonnet 32 fixed to the body 31, a valve stem 33, and a stem holding member 34 constituting an essential element of the present invention for holding the stem 33 in a screw-engaged manner.

The body 31 is provided therein with a fluid flow passage 35 comprising a inflow passage 35a and an outflow passage 35b and a stem insertion bore 36 having a bottom and formed with a centerline axis intersecting substantially perpendicularly that of the flow passage 35 at the middle part thereof. A cylindrical valve seat 37 is provided at the part where the stem insertion bore 36 intersects the flow passage 35. A valve element 38, which is a wedge-shaped gate connected to the lower end of the stem 33, is moved up or down together with the stem 33 to be separated from or seated against the valve seat 37 thereby to open or shut the flow passage 35. The stem 33 can be rotated about its axis by turning a handwheel 39 fixed to its outer or upper end. The stem 33 is provided around a portion thereof somewhat above its lower end with square screw threads 33a.

The aforementioned stem holding member 34 is generally of the shape of a hollow cylinder coaxially disposed around the stem 33 and having at its upper portion internal screw threads 34c meshed with the above mentioned screw threads 33a of the stem 33. The lower portion of this stem holding member 34 is provided around its outer surface with external screw threads 34c, which are meshed with internal screw threads 36a formed on the wall surface of the above mentioned stem insertion bore 36 at the upper open part of the body 31. Thus the stem holding member 34 is fixed to the body 31. This screw connection and fixing of the stem holding member 34 is adopted with consideration of work such as replacement of parts such as the valve gate 38.

The stem holding member 34 has at its lower end an annular contact surface 34b which, when this member 34 is fixed in place as described above, is pressed with a specific pressure in abutting state against an annular ledge 36b formed in the wall of the bore 36, thereby being in a metal-contact state. In this case, the annular contact surface 34b and the annular ledge 36b are both precision finished to exact planar surfaces and thereby constitute a first metal-contact seal 40. This first metal-contact seal 40 is continually in sealing state while the stem holding member 34 is fixed in position.

The inner wall surface of the stem holding member 34 at the lower end of the internal screw threads 34c is increased in inner diameter, whereby a downwardly facing ledge is formed. The inner rim of this ledge is chamfered to form a bevel seat surface 34d to function as described hereinafter.

The lower surface of the bonnet 32 is fixed by screws 42 to the upper surface of the body 31 with a spiral gasket 41 interposed therebetween. At the upper part of the bonnet 32, a packing 43 of the shape of a hollow cylinder is fitted between the inner wall of the bonnet and the stem 33 and is held in place by a packing retainer 45, which in turn is pressed downward against the packing 43 by a cap nut 44 screw engaged with the upper part of the bonnet 32.

When the handwheel 39 of the valve device 30 of the above described construction is turned, and the valve gate 38 is lifted off from the valve seat 37 to its fully-opened state, the fluid (not shown) in the piping flows into the flow passage 35.

In this valve device 30, the bonnet 32 is of a double-seal construction afforded by the first metal-contact seal 40 serving as a first-stage barrier and the gasket 41 and the packing 43 serving as a second-stage barrier. In addition, the passage of infiltration of the fluid into a space 46 in the interior of the bonnet 32 and around the stem 33 is limited to only the meshing part 47 between the screw threads 33a and 34c, and the rate of infiltration of the fluid into the space 46 is very low. Moreover, the pressure of the fluid infiltrating into the space 46 becomes low. For these reasons, the capability of the valve device 30 to prevent leakage of the fluid to the outside is markedly superior to that of the known valve device 10. Accordingly, this valve device 30 of the invention is highly suitable for use in places where fluids in piping must positively be prevented from leaking to the outside.

Furthermore, when the meshing part 47 of the screw threads 33a and 34c is made to be a very narrow flow passage, it acts to cushion the transmission of pressure therethrough. For this reason, the pressure of the fluid within the flow passage 35 does not act directly on the gasket 41. As a result, the serviceable life of the gasket 41 is prolonged, and the period between replacements is lengthened.

Next, the procedure of replacing the packing 43 and the gasket 41 of this valve device 30 will be described with reference to FIG. 3. This replacement of exchanging of these sealing members is carried out as described below with the valve device 30 in its opened state without shutting off the flow of the fluid through the piping including the valve device 30.

First, the handwheel 39 is turned in the valve opening direction to cause the stem 33 to reach the upper limiting position of its movement. When the stem 33 thus reaches this limiting position, the rotation of the handwheel 39 is limited. At this instant, however, the handwheel 39 is not immediately released from the turning manipulation, but a specific torque in the valve opening direction is further applied thereto, after which the handwheel manipulation is stopped.

By this handwheel manipulation, the annular edge part 33b-1 of a flange part 33b of the stem 33 near the lower end thereof is brought into a state wherein it is pressed with a specific pressure into contact against the aforementioned chamfered seat surface 34d of the stem holding member 34. These parts thus form a second metal-contact seal 48, which seals the screw meshing part 47. As a result of the functioning of the first and second metal-contact seals 40 and 48, the space 46 is placed in a state wherein it is completely sealed off from the flow passage 35, and the fluid in the flow passage 35 cannot leak out even when the bonnet 32 is disconnected and removed from the body 31.

To replace the replaceable sealing members, the handwheel 39 is first detached from the stem 33, this detaching being possible because this valve device 30 is of the inside-screw type. Next, the nut 44 is unscrewed off, and the packing 43 is extracted upward. The screws 42 are then unscrewed and removed, and the bonnet 32 is lifted straight upward, away from the body 31, until it is free of the stem 33. With the valve parts in this disassembled state, the gasket 41 and the packing 43 can be readily replaced. The disassembled valve parts are thereafter reassembled in the sequence which is reverse to that described above for disassembly.

In this case, the work of replacing the sealing members can be carried out efficiently in a short time because the bonnet 32 can be handled as a single unitary structure. This feature is highly important in positively protecting the human body from harmful effects in hazardous environments such as that involving nuclear radiation. Furthermore, this valve device 30 affords great safety because there is little possibility of leakage of the fluid to the outside at the time of replacement of the sealing members.

Since, as described above, the work of replacing the sealing members can be carried out while the valve device 30 is opened, that is, with the equipment in which the valve is installed in operation, the valve device 30 is highly suitable for use in the equipment of such facilities as nuclear power plants, facilities handling petroleum products, and city gas supplying facilities.

If, in the machining of the stem 33, the above described annular edge 33$b$-1 of the flange part 33$b$ is rounded with a radius of curvature of the order of 0.1 mm., galling or scoring of the chamfered surface 34$d$ of stem holding member 34 and damaging of the annular edge can be effectively prevented, and the metal-contact seal 48 will function with a positive sealing effect.

Furthermore, even when the valve device 30 is in its fully shut state, the space 46 is in a state wherein it is positively sealed from the flow passage 35. For this reason, replacement of the sealing members can be carried out also in the fully-shut state of the valve.

Figure 4:
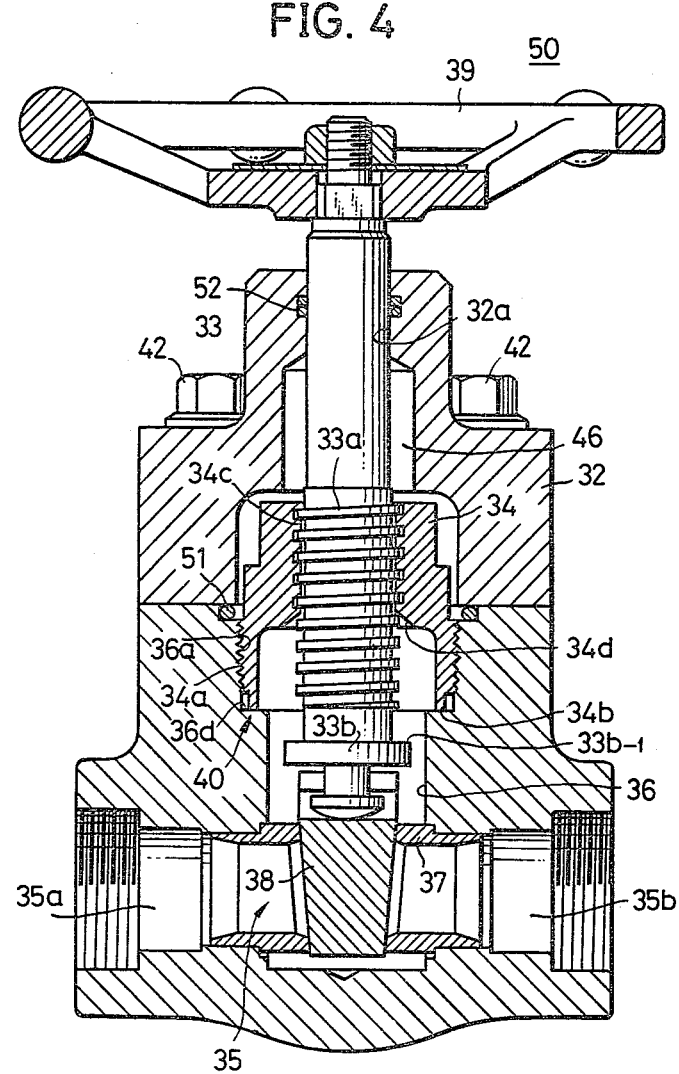
FIG. 4 is a view similar to the above figures showing a second embodiment of the valve device according to the invention.

A second embodiment of the valve of the invention will now be described with reference to FIG. 4. In FIG. 4, those structural parts which are essentially the same as corresponding parts in FIG. 2 are designated by like reference numerals. Detailed description of such parts will be omitted.

A valve device 50 of the invention has a construction which is fundamentally the same as that of the aforedescribed valve device 30 and employs O-rings for its replaceable sealing members. This valve device 50 is suitabe for use in equipment handling fluids at lower temperatures than those in the case of the aforedescribed valve device 30.

In this valve device 50, an O-ring 51 is interposed between the bonnet 32 and the body 31. In the bonnet 32, a ring 52 comprising a combination of an O-ring and a back-up ring is fitted in an annular recess formed in the inner surface of a through bore 32$a$ through which the stem 33 is passed at the upper part of the bonnet.

The replacement of the O-ring 51 and the ring 52 can be carried out rapidly, similarly as in the case of the aforedescribed valve device 30.

Because of this sealing arrangement wherein use is made of the combined ring 52 as the sealing member in the through bore 32$a$ of the bonnet 32 in this valve device 50, the force needed to turn the handwheel 39 is less than that in the case of the valve device 30 in which a gland packing is used. The reason for this is that the gland packing is being pressed by the packing retainer in order to assure its sealing performance, and consequently this increases the resistance to rotation of the handwheel. In the valve device 50, furthermore, there is little possibility of rusting of the stem 33 which tends to occur when a gland packing is used because of the halogen compounds contained in the asbestos, which is the principal constituent of the gland packing.

In the case where the above described valve devices 30 and 50 are to used in nuclear power equipment, both the stem 33 and the stem holding member 34 are made of austenitic stainless steel in consideration of their corrosion resistance. For this reason, the screw meshing part 47 becomes a combination of parts of the same material, whereby galling or scoring would readily occur. Accordingly, in the present embodiment of the invention, the threaded part 33$a$ of the stem is roll threaded thereby to increase the surface hardness thereof (for example, to a surface hardness of $H_RC$ 50). By this measure, a difference in hardness is established between the meshing screw thread parts 33$a$ and 34$c$, and galling is suppressed.

Examples of modification of the second metal-contact seal 48 in the above described valve devices 30 and 50 will now be described with reference to FIGS. 5, 6, and 7. In these figures, those constituent parts which are the same or equivalently similar to corresponding parts in FIG. 3 are designated by like reference numerals.

Referring first to FIG. 5 showing a first modification, the flange part 61 of this metal-contact seal 60 has a stellite-filled construction comprising a main body part 61$a$ and a peripheral stellite-filled part 61$b$. The stellite-filled part 61$b$ in the flange part 61 has an annular edge part 61$b$-1 which is pressed against the chamfered seat surface 34$d$ of the stem holding member 34 thereby to form the metal-contact seal 60. In this case, since there is a difference between the hardnesses of the stellite-filled part 61$b$ and the seat surface 34$d$, galling does not readily occur. Furthermore, if the annular edge part 61$b$-1 is rounded, galling and chipping of the contacting parts can be prevented with even greater effectiveness.

A second modification of the second metal-contact seal 48 is illustrated in FIG. 6. In this metal-contact seal 70, the stem holding member 34 has a ledge-like annular planar surface 34$e$ formed therein instead of the annular chamfered seat surface 34$d$. An upwardly facing planar surface 33$b$-2 of the flange part 33$b$ of the stem 33 is adapted to be abuttingly pressed against this downwardly facing annular planar surface 34$e$. In this construction, the tendency for galling to occur is less, and, moreover, the machining is easier, than in the case of the metal-contact seal 48 shown in FIG. 3.

FIG. 7 illustrates a third modification. In this metal-contact seal 80, a downwardly directed annular projection 34$f$ is formed in the stem holding member 34 in place of the annular chamfered seat surface 34$d$, and the upwardly facing planar surface 33$b$-2 of the flange part 33$b$ of the stem 33 is adapted to be abuttingly pressed against the lower planar surface 34$f$-1 of this annular projection 34$f$ with a margin of a width d left around the periphery. By this construction, a metal-contact seal can be obtained with a uniform width around the entire periphery thereof even when the centerline axes of the stem 33 and its flange part 33$c$ are out of alinement.

What we claim is:
1. A valve device comprising:
   a valve body having an inflow passage and an outflow passage;
   a valve seat fixed to the valve body at a position between said passages;

a valve element adapted to seat against and be separable from the valve seat;

a valve stem movable together with the valve element toward and away from the valve seat;

a stem holding member of a unitary construction secured at a portion thereof to the valve body in the body interior and holding the valve stem at a screw engagement part therewith, a surface at an extremity of said portion of the stem holding member being in abutting contact with a surface of the valve body thereby to form a first metal-contact seal;

a bonnet detachably fixed to the valve body and covering the remainder portion of the stem holding member, said valve stem being rotatable within said bonnet, a first sealing member interposed between said bonnet and said valve body, a second sealing member interposed between said bonnet and said valve stem; and means for forming a second metal-contact seal between the stem and the stem holding member when the valve is in the fully opened state thereof.

2. A valve device as claimed in claim 1 in which said means for forming the second metal-contact seal comprises a chamfered surface formed in stem holding member at one end of said screw engagement part and an annular edge part of a flange part of the valve stem, which edge part is pressed into contact with the chamfered surface.

3. A valve device as claimed in claim 2 in which said annular edge part has a rounded shape as viewed in a section taken along a plane passing through the valve stem axis.

4. A valve device as claimed in claim 1 in which said means for forming the second metal-contact seal comprises an annular planar surface formed in the stem holding member at the end of said screw engagement part and a planar surface of said flange part of the valve stem, which planar surface is pressed into contact with the annular planar surface formed in the stem holding member.

5. A valve device as claimed in claim 1 in which said means for forming the second metal-contact seal comprises an annular planar surface of an annular projection formed in the stem holding member at one end of said screw engagement part and a planar surface formed on said flange part of the valve stem and pressed into contact with the annular planar surface formed in the stem holding member with an annular margin left around the periphery thereof.

6. A valve device as claimed in claim 1 in which said first seating member is an O-ring.

* * * * *